US009980151B2

(12) United States Patent
Zhang

(10) Patent No.: US 9,980,151 B2
(45) Date of Patent: *May 22, 2018

(54) METHOD AND DEVICE FOR TRANSMISSION ON UNLICENSED SPECTRUM IN UE AND BASE STATION

(71) Applicant: SHANGHAI LANGBO COMMUNICATION TECHNOLOGY COMPANY LIMITED, Shanghai (CN)

(72) Inventor: Xiaobo Zhang, Shanghai (CN)

(73) Assignee: Shanghai Langbo Communication Technology Company Limited (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/125,956

(22) PCT Filed: Mar. 13, 2015

(86) PCT No.: PCT/CN2015/074174
§ 371 (c)(1),
(2) Date: Sep. 13, 2016

(87) PCT Pub. No.: WO2015/135496
PCT Pub. Date: Sep. 17, 2015

(65) Prior Publication Data
US 2017/0134960 A1  May 11, 2017

(30) Foreign Application Priority Data
Mar. 13, 2014  (CN) .......................... 2014 1 0091013

(51) Int. Cl.
*H04W 16/14* (2009.01)
*H04L 5/00* (2006.01)
(Continued)

(52) U.S. Cl.
CPC .......... *H04W 16/14* (2013.01); *H04L 1/1893* (2013.01); *H04L 5/001* (2013.01); *H04L 5/0048* (2013.01);
(Continued)

(58) Field of Classification Search
CPC .......... H04W 72/042; H04W 72/0413; H04W 72/0453; H04W 72/0406; H04W 56/0005;
(Continued)

(56) References Cited

U.S. PATENT DOCUMENTS

2009/0268685 A1* 10/2009 Chen ...................... H04L 1/1854
370/329
2012/0250631 A1  10/2012 Hakola et al.
(Continued)

FOREIGN PATENT DOCUMENTS

CN       102577291 A     7/2012
CN       103188711 A     7/2013
(Continued)

OTHER PUBLICATIONS

International Search Report dated Jun. 16, 2015 from International Patent Application No. PCT/CN2015/074174 filed Mar. 13, 2015.
(Continued)

*Primary Examiner* — Daniel Lai
(74) *Attorney, Agent, or Firm* — Stevens & Showalter, LLP

(57) ABSTRACT

The present disclosure provides a method and device for transmission on unlicensed spectrum in a UE and a base station. In view of the problem of DFS constraints and PHICH resource waste that is caused by communication of an uplink synchronous HARQ on unlicensed spectrum, in the present disclosure, logical information is configured so that PUSCHs transmitted through different sub-frames on different physical carriers form one logical carrier, and
(Continued)

PHICH resources are reserved for the logical carrier. As an embodiment, downlink signaling is sent in a sub-frame for sending a PHICH so as to indicate transmission bandwidth for data retransmission. The solution provided in the present disclosure saves PHICH resources and eliminates the constraints on the DFS by the synchronous HARQ. Besides, the present disclosure reuses the CA scheme in the existing LTE as much as possible, and has high compatibility.

19 Claims, 3 Drawing Sheets

(51) Int. Cl.
    *H04W 72/04*     (2009.01)
    *H04L 1/18*     (2006.01)

(52) U.S. Cl.
    CPC ....... *H04L 5/0055* (2013.01); *H04W 72/0413* (2013.01); *H04W 72/0453* (2013.01)

(58) Field of Classification Search
    CPC .. H04W 72/044; H04W 16/14; H04L 1/1893; H04L 5/0055; H04L 5/0048; H04L 5/001
    See application file for complete search history.

(56) References Cited

U.S. PATENT DOCUMENTS

| | | |
|---|---|---|
| 2012/0264468 A1 | 10/2012 | Turtinen et al. |
| 2012/0281594 A1 | 11/2012 | Stewart et al. |
| 2013/0128855 A1* | 5/2013 | Noh ...................... H04L 5/0051 370/329 |
| 2014/0036818 A1 | 2/2014 | Koskela |
| 2014/0064203 A1* | 3/2014 | Seo ...................... H04W 28/06 370/329 |

FOREIGN PATENT DOCUMENTS

| | | |
|---|---|---|
| CN | 103580840 A | 2/2014 |
| CN | 103609186 A | 2/2014 |
| WO | 2011144803 A1 | 11/2011 |
| WO | 2013131268 A1 | 9/2013 |

OTHER PUBLICATIONS

International Search Report dated Jun. 11, 2015 from International Patent Application No. PCT/CN2015/073903 filed Mar. 9, 2015.

* cited by examiner

METHOD AND DEVICE FOR TRANSMISSION ON UNLICENSED SPECTRUM IN UE AND BASE STATION

CROSS-REFERENCE TO RELATED APPLICATION

This application is a U.S. National Phase application under 35 U.S.C. § 371 of International Application No. PCT/CN2015/074174, filed on Mar. 13, 2015, and claims benefit to Chinese Patent Application No. CN 201410091013.4, filed on Mar. 13, 2014, all of which is hereby incorporated by reference for all purposes. The International Application was published in China on Sep. 17, 2015 as WO2015135496 A1 under PCT Article 21 (2).

BACKGROUND

Technical Field

The present disclosure is related to an unlicensed spectrum communication scheme applied in the wireless communication system, and more particular to a method and device for communication on an unlicensed spectrum based on long term evolution (LTE).

Related Art

In the traditional LTE system of 3rd Generation Partner Project (3GPP), the data transmission only occur on the licensed spectrum; however, with the sharp increase in the transmission capacity, especially in some urban areas, the licensed spectrum may be difficult to meet the demand of the transmission capacity. A new research topic is discussed in 3GPP RAN 62 plenary, i.e. the comprehensive research of the unlicensed spectrum (RP-132085), and the main purpose is to research the non-standalone deployment of LTE on the unlicensed spectrum, wherein the so-called non-standalone means that the communication on the unlicensed spectrum is associated with the serving cell on the licensed spectrum. An intuitive approach is to reuse the carrier aggregation (CA) concept in the existing system as much as possible, i.e. the serving cell deployed on the licensed spectrum serves as the primary component carrier (PCC), and the serving cell deployed in the unlicensed spectrum serves as the secondary component carrier (SCC).

In the traditional CA, the user equipment (UE) is capable of being configured with no more than 5 serving cells, and each of the serving cells includes a downlink physical resource and a possible uplink physical resource. For the frequency division duplex (FDD) system, the physical resource is a frequency band, and for the time division duplex (TDD) system, the physical resource is a frequency band and a sub frame. According to the scheduling of the base station, the UE transmits the physical uplink shared channel (PUSCH) data on the uplink physical resource, and receives the hybrid automatic repeat request (HARQ) acknowledgement (HARQ_ACK) to determine whether the PUSCH data is received correctly. The HARQ_ACK is transmitted on the physical HARQ indicator channel (PHICH). The LTE system uses the synchronization PUSCH re-transmission, i.e. if NACK is received, the re-transmission data is transmitted according to the same scheduling initially transmitted, the re-transmission data is transmitted in the predefined sub frame.

For the unlicensed spectrum, considering the non-controllable/predictable of the interference level thereof, the UE may be configured with more uplink carriers, and the base station uses a manner of dynamical frequency selection (DFS) to select a part of uplink carriers for transmitting the PDSCH from the candidate uplink carriers (in a given sub frame). Further, considering the bandwidth of the unlicensed spectrum is larger, for example there is an available unlicensed spectrum of about 500 MHz near the carrier frequency of only 5 GHz, the number of the carriers available for the UE may be quite large (larger than 5).

The traditional carrier aggregation scheme on the unlicensed spectrum communication may encounter the following problems:

the synchronization uplink HARQ limits the application of DFS, i.e. the DFS operation may not performed before the HARQ re-transmission is finished; and excessive PHICH resources are pre-served, i.e. for each of DFS candidate uplink carriers, it needs preserving a certain PHICH resource, the resources is wasted especially when a quantity of DFS candidate uplink carriers is larger.

For the above problems, the present disclosure discloses a method and device for the transmission on an unlicensed spectrum.

SUMMARY

The present disclosure provides a method for transmission on an unlicensed spectrum in a UE, wherein the method includes the following steps:

Step A: receiving a higher layer signaling to obtain S and V, wherein the S is L configuration information, the V is N logical information, each of the configuration information includes a carrier index and a working frequency band, and each of the logical information includes at least one of the following:

a carrier logical index;

an antenna information, wherein the antenna information includes a transmission mode; and a cross carrier information, wherein the cross carrier information includes a serving cell index;

Step B: receiving a first DCI, wherein the first DCI includes a virtual index, a physical information and a scheduling information, and the scheduling information includes a demodulation reference signal (DMRS) cyclic shift indication; and Step C: transmitting a first uplink data from the working frequency band of a first configuration information in a given sub frame according to the scheduling information of the first DCI;

wherein, the first DCI complies with a configuration of a first logical information; the first logical information is that one logical information of the V with the carrier logical index being equal to the virtual index of the first DCI; all the working frequency bands of the S belong to the unlicensed spectrum, the L is a positive integer, the N is a positive integer not greater than L, and the first configuration information is that one configuration information of the S with the carrier index being equal to the physical index of the first DCI.

The DMRS cyclic shift indication dynamically configures a cyclic shift parameter of DMRS applied by the uplink data. In one embodiment, the DMRS cyclic shift indication includes three bits, and the DMRS cyclic shift indication and a cyclic shift mapping of the uplink DMRS refer to Table 5.5.2.1.1-1 of TS36.211.

The character of the above aspect is that the logical carrier is identified by using the logical information, and the logical carrier is identified by determining whether the virtual index carried by the DCI equals to the carrier logical index of the corresponding logical information or not. The PUSCH scheduled by the DCI carrying the same virtual index belongs to the same logical carrier, and shares the configuration corresponding to the logical information, such as the cross carrier information and the transmission mode.

In one preferred embodiment, the sentence that the first DCI complies with a configuration of a first logical information includes at least one of the following:
   the first DCI is transmitted on a serving cell indicated by a serving cell index of the first logical information;
   an optional format of the first DCI is indicated by a transmission mode of the first logical information; and
   whether the first uplink data may employ four antenna ports or not is indicated by an antenna information of the first logical information.

In one preferred embodiment, the configuration information includes all or part of information of PhysicalConfigDedicatedSCell-r10 and RadioResourceConfigCommon-SCell-r10.

In one preferred embodiment, an activation/deactivation state of the configuration information of the V is set as an activation state by a media access control (MAC) signaling.

In one preferred embodiment, the working frequency band includes a carrier center frequency and a carrier bandwidth. In another embodiment, the working frequency band includes a down frequency and an up frequency.

In one preferred embodiment, the carrier logical index is a positive integer less than 8—using three bits to indicate the carrier logical index and 0 is configured to the primary cell.

In one preferred embodiment, the antenna information includes all or part of information of AntennaInfoUL-r10 in LTE.

In one preferred embodiment, the cross carrier information includes all or part of information of crossCarrierSchedulingConfig in LTE.

In one embodiment, the higher layer signaling is a radio resource control (RRC) signaling.

In one preferred embodiment, the uplink data is transmitted on PUSCH.

In one preferred embodiment, the logical information includes the cross carrier information, and the first DCI is transmitted on a downlink resource of a serving cell identified by the cross carrier information of the first logical information.

In one preferred embodiment, the N is 1.

In one preferred embodiment, the configuration information further includes at least one of the following:
   a cell physical identification, wherein the cell physical indicator is a positive integer from 0 to 503;
   a power control configuration information;
   a PUSCH configuration information, wherein the PUSCH configuration information includes a DMRS cyclic shift offset;
   a maximum transmission power; and
   a SRS configuration information.

The DMRS cyclic shift offset is an integer from 0 to 11.
In one preferred embodiment, a cyclic shift of DMRS associated with the first uplink data is determined by a sum of the DMRS cyclic shift indication of the first DCI and the DMRS cyclic shift offset of the first configuration information.

In one preferred embodiment, the cell physical identifier is used for a scrambling operation of the uplink data and the reference signal transmitted on the working bandwidth of the corresponding configuration information.

In one preferred embodiment, the power control configuration information includes all or part of information of uplinkPowerControlDedicatedSCell and UplinkPowerControlCommonSCell.

In one preferred embodiment, the PUSCH configuration information includes all or part of information of PUSCH-ConfigDedicatedSCell and pusch-ConfigCommon-r10.

In one preferred embodiment, the SRS configuration information includes all or part of information of soundingRS-UL-ConfigCommon-r10.

In one preferred embodiment, the V shares the same transmission mode.

In one preferred embodiment, the method further includes the following step:
   Step D: receiving a downlink signaling to obtain a HARQ_ACK information associated with the first uplink data, wherein the downlink signaling is transmitted on a downlink resource of a serving cell identified by the cross carrier information of the first logical information, and a physical resource occupied by the HARQ_ACK information is determined by at least one of the following:
      the DMRS cyclic shift indication of the first DCI; and
      a lowest PRB index for the first uplink data on the working frequency band of the first configuration information.

In one preferred embodiment, the physical resource is determined according to a PHICH scheme of LTE, and the PHICH scheme of the LTE assumes that $n_{DMRS}$ is the DMRS cyclic shift indication and $I_{PRB_{RA}}^{lowest\_index}$ is the lowest PRB index.

In one preferred embodiment, the physical resource is formed of the index pair ($n_{PHICH}^{group}$, $n_{PHICH}^{seq}$), wherein $n_{PHICH}^{group}$ is PHICH group number, $n_{PHICH}^{seq}$ is a sequence index within the PHICH group:

$$n_{PHICH}^{group} = (I_{PRB\_RA} + n_{DMRS}) \bmod N_{PHICH}^{group} + I_{PHICH} N_{PHICH}^{group}$$

$$n_{PHICH}^{seq} = (\lfloor I_{PRB\_RA}/N_{PHICH}^{group} \rfloor + n_{DMRS}) \bmod 2N_{SF}^{PHICH}$$

wherein, $n_{DMRS}$ is determined by the DMRS cyclic shift indication of the first DCI, $I_{PRB\ RA}$ determined by the lowest PRB index. $I_{PRB\ RA}$ indicates the lowest PRB index (or plus 1) occupied by the given TB on a first time slot of PUSCH, mod indicates disjunctive complement, $I_{PHICH}$ is the adjusting parameter (for other frame structures are 0) used by the TDD UL/DL frame structure, $N_{SF}^{PHICH}$ indicates an extension factor. The detailed description refers to Section 9.1.2 of TS36.213.

In one preferred embodiment, the method further includes the following step:
   Step E: transmitting a re-transmission data of the first uplink data, and a transmitting frequency band of the re-transmission data is one of the following:
      Option 1: the working frequency band of the first configuration information; and
      Option 2: the working frequency band of one configuration information among the S with the carrier index being equal to the physical index of the downlink signaling.

The present disclosure provides a method for transmission on an unlicensed spectrum in a base station, wherein the method includes the following steps:
   Step A: transmitting a higher layer signaling to indicate S and V, wherein the S is L configuration information, the V is N logical information, each of the configuration information includes a carrier index and a working frequency band, and each of the logical information includes at least one of the following:
  a carrier logical index;
  an antenna information, wherein the antenna information includes a transmission mode; and
  a cross carrier information, wherein the cross carrier information includes a serving cell index;
Step B: transmitting a first DCI, wherein the first DCI includes a virtual index, a physical information and a scheduling information, and the scheduling information includes a DMRS cyclic shift indication; and
Step C: receiving a first uplink data from the working frequency band of a first configuration information in a given sub frame according to the scheduling information of the first DCI;
wherein, the first DCI complies with a configuration of a first logical information; the first logical information is that one logical information of the V with the carrier logical index being equal to the virtual index of the first DCI; all the working frequency bands of the S belong to the unlicensed spectrum, the L is a positive integer, the N is a positive integer not greater than L, and the first configuration information is that one configuration information of the S with the carrier index being equal to the physical index of the first DCI.

In one preferred embodiment, the logical information includes the cross carrier information, and the first DCI is transmitted on a downlink resource of a serving cell identified by the cross carrier information of the first logical information.

In one preferred embodiment, the carrier logical index is a positive integer less than 8.

In one preferred embodiment, the configuration information further includes at least one of the following:
  a cell physical identification, the cell physical indicator is a positive integer from 0 to 503;
  a power control configuration information;
  a PUSCH configuration information, the PUSCH configuration information includes a DMRS cyclic shift offset;
  a CQI configuration information;
  a maximum transmission power; and
  a SRS configuration information.

In one preferred embodiment, the cell physical identifier is used to a scrambling operation of the uplink data and the reference signal received on the working bandwidth of the corresponding configuration information.

In one preferred embodiment, the V shares the same transmission mode.

In one preferred embodiment, the antenna information of the N logical information is configured by a common information element (IE) or is predetermined.

In one preferred embodiment, the method further includes the following step:
  Step D: transmitting a downlink signaling to obtain a HARQ_ACK information associated with the first uplink data, the downlink signaling is transmitted on a downlink resource of a serving cell identified by the cross carrier information of the first logical information, and a physical resource occupied by the HARQ_ACK information is determined by at least one of the following:
    the DMRS cyclic shift indication of the first DCI; and
    a lowest PRB index for the first uplink data on the working frequency band of the first configuration information.

In one preferred embodiment, the physical resource is determined according to a PHICH scheme of LTE, and the PHICH scheme of the LTE assumes that $n_{DMRS}$ is the DMRS cyclic shift indication and $I_{PRB\_RA}^{lowest\_index}$ is the lowest PRB index.

In one preferred embodiment, the method includes the following step:
  Step E: receiving a re-transmission data of the first uplink data, and a transmitting frequency band of the re-transmission data is one of the following:
    Option 1: the working frequency band of the first configuration information; and
    Option 2: the working frequency band of one configuration information among the S with the carrier index being equal to the physical index of the downlink signaling.

If the transmitting frequency band of the re-transmission data is the Option 2, i.e, one uplink HARQ process may be distributed on different frequency bands, thereby avoiding the traditional synchronization uplink HARQ for the limitation of DFS. Further, the downlink signaling is one of the following:
  it does not include the scheduling information, i.e. besides the frequency band is different, HARQ re-transmission data and the original transmission data use the same scheduling scheme;
  it includes the scheduling information, i.e. the character thereof is asynchronous uplink HARQ.

The present disclosure provides an user equipment, which includes:
  a first module, for receiving a higher layer signaling to obtain S and V, wherein the S is L configuration information, the V is N logical information, each of the configuration information includes a carrier index and a working frequency band, and each of the logical information includes at least one of the following:
    a carrier logical index;
    an antenna information, the antenna information includes a transmission mode; and
    a cross carrier information, the cross carrier information includes a serving cell index;
  a second module, for receiving a first DCI, the first DCI includes a virtual index, a physical information and a scheduling information, and the scheduling information includes a DMRS cyclic shift indication; and
  a third module, for transmitting a first uplink data from the working frequency band of a first configuration information in a given sub frame according to the scheduling information of the first DCI;
  wherein, the first DCI complies with a configuration of a first logical information; the first logical information is that one logical information of the V with the carrier logical index being equal to the virtual index of the first DCI; all the working frequency bands of the S belong to the unlicensed spectrum, the L is a positive integer, the N is a positive integer not greater than L, and the first configuration information is that one configuration information of the S with the carrier index being equal to the physical index of the first DCI.

In one preferred embodiment, the user equipment further includes:
  a fourth module, for receiving a downlink signaling to obtain a HARQ_ACK information associated with the first uplink data, wherein the downlink signaling is transmitted on a downlink resource of a serving cell identified by the cross carrier information of the first logical information, and a physical resource occupied by the HARQ_ACK information is determined by at least one of the following:
the DMRS cyclic shift indication of the first DCI; and
a lowest PRB index for the first uplink data on the working frequency band of the first configuration information; and
a fifth module, for transmitting a re-transmission data of the first uplink data, and a transmitting frequency band of the re-transmission data is one of the following:
Option 1: the working frequency band of the first configuration information; and
Option 2: the working frequency band of one configuration information among the S with the carrier index being equal to the physical index of the downlink signaling.

The present disclosure provides a base station equipment, which includes:
a first module, for transmitting a higher layer signaling to indicate S and V, wherein the S is L configuration information, the V is N logical information, each of the configuration information includes a carrier index and a working frequency band, and each of the logical information includes at least one of the following:
a carrier logical index;
an antenna information, wherein the antenna information includes a transmission mode; and
a cross carrier information, wherein the cross carrier information includes a serving cell index;
a second module, for transmitting a first DCI, wherein the first DCI includes a virtual index, a physical information and a scheduling information, and the scheduling information includes a DMRS cyclic shift indication; and
a third module, for receiving a first uplink data from the working frequency band of a first configuration information in a given sub frame according to the scheduling information of the first DCI;
wherein, the first DCI complies with a configuration of a first logical information; the first logical information is that one logical information of the V with the carrier logical index being equal to the virtual index of the first DCI; all the working frequency bands of the S belong to the unlicensed spectrum, the L is a positive integer, the N is a positive integer not greater than L, and and the first configuration information is that one configuration information of the S with the carrier index being equal to the physical index of the first DCI.

In one preferred embodiment, the base station equipment further includes:
a fourth module, for transmitting a downlink signaling to indicate a HARQ_ACK information associated with the first uplink data, wherein the downlink signaling is transmitted on a downlink resource of a serving cell identified by the cross carrier information of the first logical information, and a physical resource occupied by the HARQ_ACK information is determined by at least one of the following:
the DMRS cyclic shift indication of the first DCI; and
a lowest PRB index for the first uplink data on the working frequency band of the first configuration information; and
a fifth module, for receiving a re-transmission data of the first uplink data, and a transmitting frequency band of the re-transmission data is one of the following:
Option 1: the working frequency band of the first configuration information; and
Option 2: the working frequency band of one configuration information among the S with the carrier index being equal to the physical index of the downlink signaling.

For the problem of the DFS limitation and the waste of the PHICH resource caused by the uplink synchronous HARQ on the unlicensed spectrum communication, the present disclosure provides a method and device for transmission on the unlicensed spectrum. The logical information is configured such that the PUSCH transmitted by the different sub frames on the different physical carriers forms one logical carrier, so as to pre-reserve the PHICH resource for the logical carrier. In one preferred embodiment, the sub frame for transmitting PHICH transmits the downlink signaling to indicate the transmitting bandwidth of the re-transmission data. The scheme of the present disclosure saves the PHICH resource and eliminates the limitation of synchronization HARQ for DFS. Furthermore, the present disclosure is as possible as capable of reusing the CA scheme in the existing LTE, thus it has a good compatibility.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
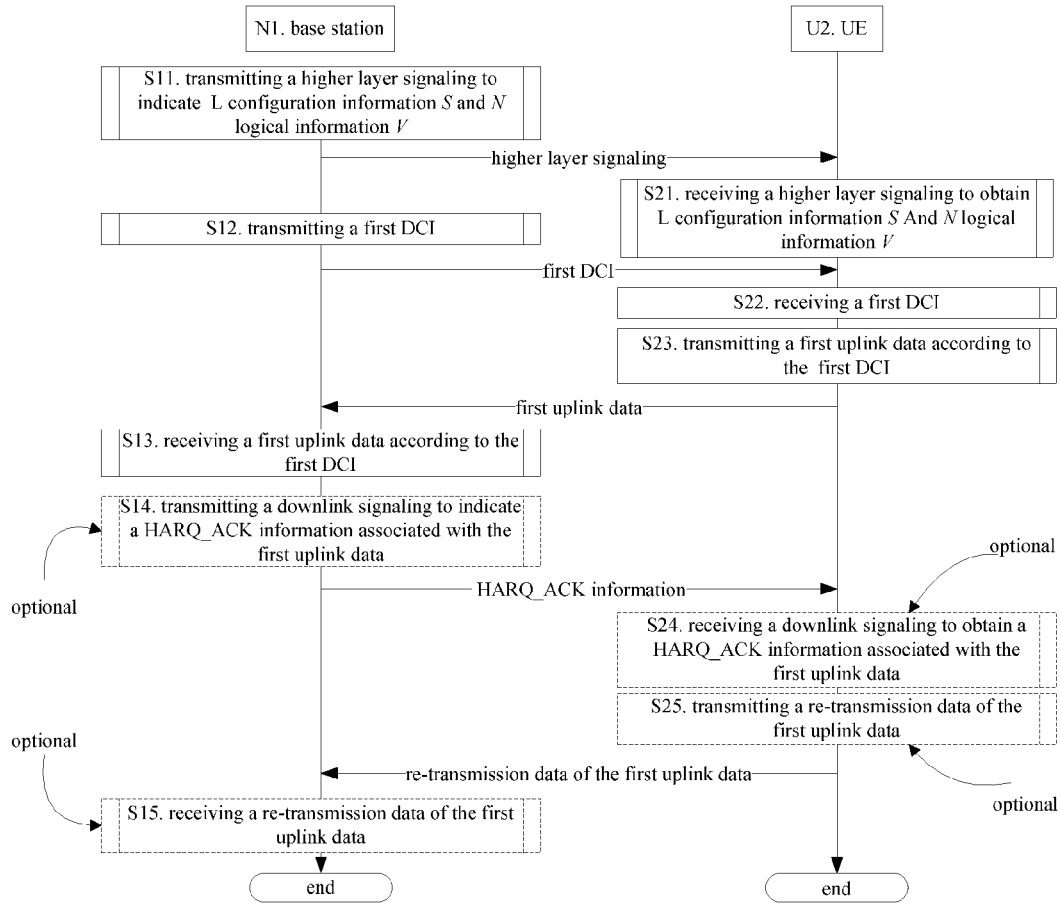
FIG. 1 is a flowchart of transmitting the downlink data on an unlicensed spectrum according to one embodiment of the present disclosure.

Embodiment I is a flowchart of transmitting the downlink data on an unlicensed spectrum, as shown in FIG. 1. In FIG. 1, a base station N1 is a service base station of UE U2, and the steps S14, S15, S24 and S25 are optional steps.

For the base station N1, in step S11, transmitting a higher layer signaling to indicate S and V, wherein the S is L configuration information, and the V is N logical information; in step S12, transmitting a first DCI; in step S13, receiving a first uplink data from the working frequency band of a first configuration information in a given sub frame according to the scheduling information of the first DCI.

For the UE U2, in step S21, receiving a higher layer signaling to obtain S and V, wherein the S is L configuration information, and the V is N logical information; in step S22, receiving a first DCI; in step S23, transmitting a first uplink data from the working frequency band of a first configuration information in a given sub frame according to the scheduling information of the first DCI.

In Embodiment I, the first DCI includes a virtual index, a physical information and a scheduling information, the scheduling information includes a DMRS cyclic shift indication, and the first logical information is that one logical information of the V with the carrier logical index being equal to the virtual index of the first DCI. All the working frequency bands of the S belong to the unlicensed spectrum, the L is a positive integer, the N is a positive integer not greater than L, and the first configuration information is that one configuration information of the S with the carrier index being equal to the physical index of the first DCI.

The configuration information includes a carrier index and a working frequency band, and each of the logical information includes at least one of the following:
  a carrier logical index;
  an antenna information, the antenna information includes a transmission mode; and
  a cross carrier information, the cross carrier information includes a serving cell index.

The configuration of the first logical information complied by the first DCI includes at least one of the following:
  the first DCI is transmitted on a serving cell indicated by a serving cell index of the first logical information;
  an optional format of the first DCI is indicated by a transmission mode of the first logical information; and
  whether the first uplink data may employ four antenna ports or not is indicated by an antenna information of the first logical information.

In a preferred sub embodiment 1 of Embodiment I:

For the base station N1, in step S14, transmitting a downlink signaling to indicate a HARQ_ACK information associated with the first uplink data; in step S15, receiving a re-transmission data of the first uplink data.

For the UE U2, in step S24, receiving a downlink signaling to obtain a HARQ_ACK information associated with the first uplink data; in step S25, transmitting a re-transmission data of the first uplink data.

In the sub embodiment 1 of Embodiment I, the downlink signaling is transmitted on a downlink resource of a serving cell identified by the cross carrier information of the first logical information, and a physical resource occupied by the HARQ_ACK information is determined by at least one of the following:
  the DMRS cyclic shift indication of the first DCI; and
  a lowest PRB index for the first uplink data on the working frequency band of the first configuration information.

A transmitting frequency band of the re-transmission data is one of the following:
  Option 1: the working frequency band of the first configuration information; and
  Option 2: the working frequency band of one configuration information among the S with the carrier index being equal to the physical index of the downlink signaling.

Embodiment II

Figure 2:
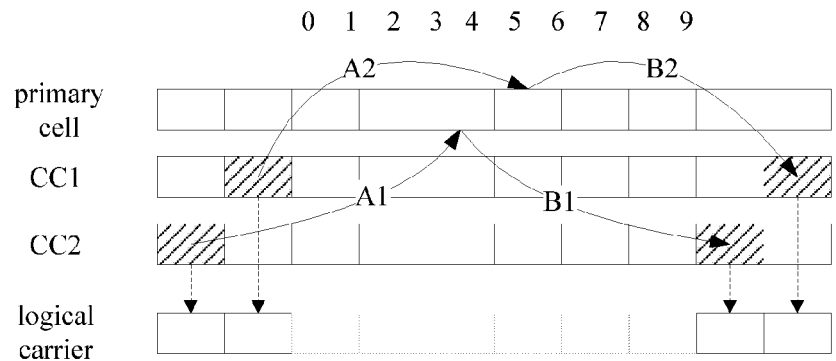
FIG. 2 is a schematic diagram illustrating a scheduling carrier which is a logical carrier of FDD carrier according to one embodiment of the present disclosure.

Embodiment II is a schematic diagram illustrating a scheduling carrier which is a logical carrier of FDD carrier, as shown in FIG. 2. In FIG. 2, the primary cell is deployed on a FDD cell of the licensed spectrum, and the physical carriers CC1 to CC2 are deployed on the unlicensed spectrum. A small square indicates one sub frame.

For the base station, firstly, a higher layer signaling is transmitted to indicate S and V, wherein S is two configuration information (respectively corresponding to CC1 and CC2), and V is one configuration information; a first DCI is transmitted; a first uplink data is received from the working frequency band of a first configuration information in a given sub frame according to the scheduling information of the first DCI; a downlink signaling is transmitted to indicate a HARQ_ACK information associated with the first uplink data; and if the HARQ_ACK is NACK, then a re-transmission data of the first uplink data is received.

For the UE, firstly, a higher layer signaling is received to obtain S and V, wherein S is two configuration information (respectively correspond to CC1 and CC2), and V is one configuration information; a first DCI is received; a first uplink data is transmitted from the working frequency band of a first configuration information in a given sub frame according to the scheduling information of the first DCI; a downlink signaling is received to obtain a HARQ_ACK information associated with the first uplink data; and if the HARQ_ACK is NACK, then a re-transmission data of the first uplink data is transmitted.

In Embodiment II, the first DCI includes a virtual index, a physical information and a scheduling information, the first DCI complies with a configuration of a first logical information, the scheduling information includes a DMRS cyclic shift indication, and the first logical information is that one logical information of the V with the carrier logical index being equal to the virtual index of the first DCI. All the working frequency bands of the S belong to the unlicensed spectrum, and the first configuration information is that one configuration information of the S with the carrier index being equal to the physical index of the first DCI.

In Embodiment II, each of the configuration information includes a carrier index and a working frequency band, and each of the logical information includes at least one of the following:
  a carrier logical index;
  an antenna information, wherein the antenna information includes a transmission mode; and
  a cross carrier information, wherein the cross carrier information includes a serving cell index.

The configuration information further includes at least one of the following:
  a cell physical identification, the cell physical indicator is a positive integer from 0 to 503;
  a power control configuration information;
  a PUSCH configuration information, the PUSCH configuration information includes a DMRS cyclic shift offset;
  a maximum transmission power; and
  a SRS configuration information.

The downlink signaling is transmitted on a downlink resource of a serving cell identified by the cross carrier information of the first logical information, a physical resource occupied by the HARQ_ACK information determines the physical resource according to a PHICH scheme of LTE, and the PHICH scheme of the LTE assumes that $n_{DMRS}$ is the DMRS cyclic shift indication of the first DCI and $I_{PRB\_RA}^{lowest\_index}$ is the lowest PRB index on the working frequency band of the first configuration information.

In Embodiment II, a synchronization HARQ re-transmission is used. When the given sub frame is sub frame 0, the physical index of the first DCI indicates CC2, (according to the PHICH scheme of the LTE) the corresponding HARQ_ACK (indicated by the downlink signaling) is located on the sub frame 4 of the downlink carrier of the primary cell (as shown by an arrow A1), and the re-transmission data is located on the sub frame 8 of CC2 (as shown by an arrow B1).

When the given sub frame is sub frame 0, the physical index of the first DCI indicates CC1, (according to the PHICH scheme of the LTE) the corresponding HARQ_ACK (indicated by the downlink signaling) is located on the sub frame 5 of the downlink carrier of the primary cell (as shown by an arrow A2), and the re-transmission data is located on the sub frame 9 of CC1 (as shown by an arrow B2).

In the sub frame 0 and the sub frame 4, the virtual indexes of the first DCI are the same, thus the sub frame 0 and 8 of CC2 and the sub frame 1 and 9 of CC1 observe the configuration of the first logical information (identified by the virtual index of the first DCI), so as to form one logical carrier, as shown in FIG. 2, wherein a dotted line frame indicates the sub frames which are not distributed.

Embodiment III

Figure 3:
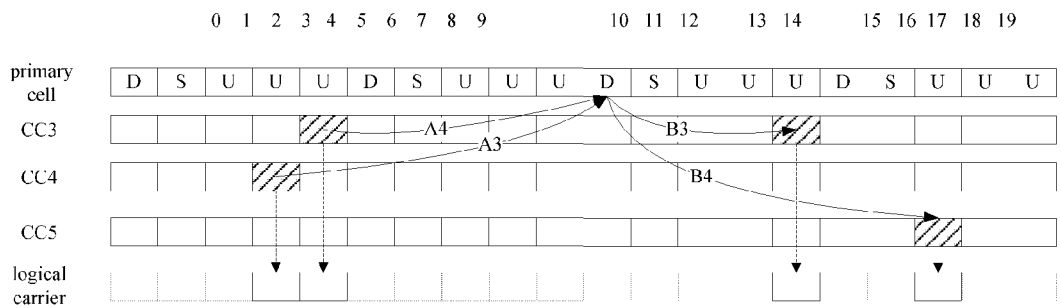
FIG. 3 is a schematic diagram illustrating a scheduling carrier which is a logical carrier of TDD carrier according to one embodiment of the present disclosure.

Embodiment III is a schematic diagram illustrating a scheduling carrier which is a logical carrier of TDD carrier, as shown in FIG. 3. In FIG. 3, the primary cell is deployed on a TDD cell of the licensed spectrum, and the physical carriers CC3 to CC5 are deployed on the unlicensed spectrum. A small square indicates one sub frame.

For the base station, firstly, a higher layer signaling is transmitted to indicate S and V, wherein S is two configuration information (respectively correspond to CC3 to CC5), and V is one configuration information; a first DCI is transmitted; a first uplink data is received from the working frequency band of a first configuration information in a given sub frame according to the scheduling information of the first DCI; a downlink signaling is transmitted to indicate a HARQ_ACK information associated with the first uplink data; and if the HARQ_ACK is NACK, then a re-transmission data of the first uplink data is received.

For the UE, firstly, a higher layer signaling is received to obtain S and V, wherein S is two configuration information (respectively correspond to CC3 to CC5), and V is one configuration information; a first DCI is received; a first uplink data is transmitted from the working frequency band of a first configuration information in a given sub frame according to the scheduling information of the first DCI; a downlink signaling is received to obtain a HARQ_ACK information associated with the first uplink data; and if the HARQ_ACK is NACK, then a re-transmission data of the first uplink data is transmitted.

In Embodiment III, the first DCI includes a virtual index, a physical information and a scheduling information, and the virtual index of the first DCI includes three bits and a value range thereof is from 1 to 7. The bit number and the value range of the physical index may be configured or may be predetermined. The first DCI complies with a configuration of the first logical information, the scheduling information includes a DMRS cyclic shift indication, and the first logical information is that one logical information of the V with the carrier logical index being equal to the virtual index of the first DCI. All the working frequency bands of the S belong to the unlicensed spectrum, and the first configuration information is that one configuration information of the S with the carrier index being equal to the physical index of the first DCI.

In Embodiment III, each of the configuration information includes a carrier index and a working frequency band, and each of the logical information includes at least one of the following:

a carrier logical index;
an antenna information, the antenna information includes a transmission mode; and
a cross carrier information, the cross carrier information includes a serving cell index.

In Embodiment III, the primary cell uses a TDD frame structure #0, and the uplink HARQ re-transmission supports DFS.

When the given sub frame is sub frame 3, the physical index of the first DCI indicates CC4, (according to the PHICH scheme of the LTE) the corresponding HARQ_ACK (indicated by the downlink signaling) is located on the sub frame 10 of the primary cell (as shown by an arrow A3), and the re-transmission data is located on the sub frame 14 of CC3 (indicated by the physical index of the downlink signaling) (as shown by an arrow B3).

When the given sub frame is sub frame 4, the physical index of the first DCI indicates CC3, (according to the PHICH scheme of the LTE) the corresponding HARQ_ACK (indicated by the downlink signaling) is located on the sub frame 10 of the primary cell (as shown by an arrow A4), and the re-transmission data is located on the sub frame 17 of CC5 (indicated by the physical index of the downlink signaling) (as shown by an arrow B4).

In the sub frame 0 and the sub frame 4, the virtual indexes of the first DCI are the same, thus the sub frame 3 of CC4, the sub frame 4 and the sub frame 14 of CC3 and the sub frame 17 of CC5 observe the configuration of the first logical information (identified by the virtual index of the first DCI), so as to form one logical carrier, as shown in FIG. 3, wherein a dotted line frame indicates the sub frames which are not distributed.

Embodiment IV

Figure 4:
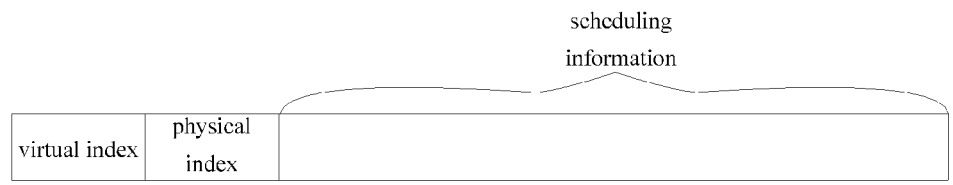
FIG. 4 is a schematic diagram illustrating a first DCI according to one embodiment of the present disclosure.

Embodiment IV is a schematic diagram illustrating a first DCI, as shown in FIG. 4. In FIG. 4, the first DCI includes a virtual index, a physical information and a scheduling information, and the scheduling information includes a DMRS cyclic shift indication.

The virtual index of the first DCI includes three bits, and a value range thereof is from 1 to 7. The bit number and the value range of the physical index may be configured or may be predetermined. The bit number of the physical index is not less than $\log_2 L$, wherein the L is a quantity of the physical carriers, configured by the UE on the current unlicensed spectrum, received by the first DCI (i.e. the quantity of the configuration information in the present disclosure).

In a preferred sub embodiment of Embodiment IV, the scheduling information includes all or part of information bits of the format 0 of LTE DCI.

In another preferred sub embodiment of Embodiment IV, the scheduling information includes all or part of information bits of the format 4 of the LTE DCI.

Embodiment V

Figure 5:
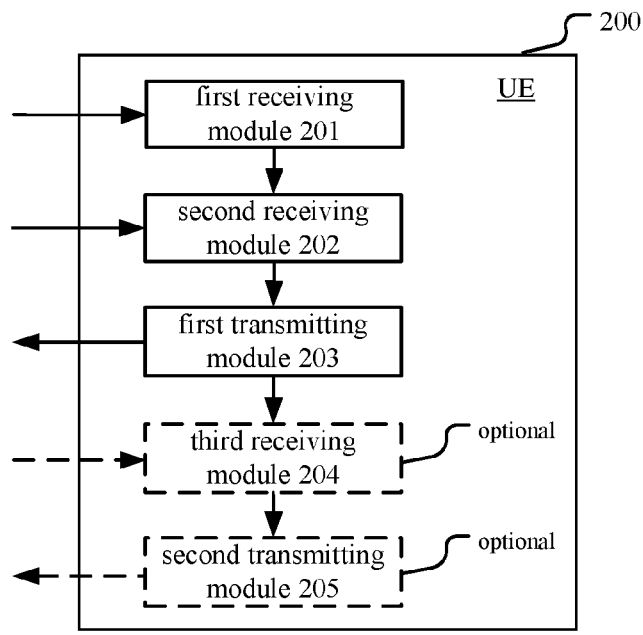
FIG. 5 is a structure schematic diagram illustrating a processing device in a UE according to one embodiment of the present disclosure.

Embodiment V is a structure schematic diagram illustrating a processing device in a UE, as shown in FIG. 5. In FIG. 5, the processing device 200 in the UE mainly includes a first receiving module 201, a second receiving module 202, a first transmitting module 203, a third receiving module 204 and a second transmitting module 205, wherein the third receiving module 204 and the transmitting module 205 are an optional module.

The receiving module 201 is used for receiving a higher layer signaling to obtain S and V, wherein the S is L configuration information, and the V is N logical information; the receiving module 202 is used for receiving a first DCI; the first transmitting module 203 is used for transmitting a first uplink data from the working frequency band of a first configuration information in a given sub frame according to the scheduling information of the first DCI; the third receiving module 204 is used for receiving a downlink signaling to obtain a HARQ_ACK information associated with the first uplink data; the second transmitting module 205 is used for transmitting a re-transmission data of the first uplink data.

In Embodiment V, each of the configuration information includes a carrier index and a working frequency band, and each of the logical information includes at least one of the following:
  a carrier logical index;
  an antenna information, the antenna information includes a transmission mode; and
  a cross carrier information, the cross carrier information includes a serving cell index.

The first DCI includes a virtual index, a physical information and a scheduling information, and the scheduling information includes a DMRS cyclic shift indication. The first DCI complies with a configuration of a first logical information, and the first logical information is that one logical information of the V with the carrier logical index being equal to the virtual index of the first DCI. The first DCI is transmitted on a downlink resource of a serving cell identified by the cross carrier information of the first logical information. All the working frequency bands of the S belong to the unlicensed spectrum, the L is a positive integer, the N is a positive integer not greater than L, and the first configuration information is that one configuration information of the S with the carrier index being equal to the physical index of the first DCI. The downlink signaling is transmitted on a downlink resource of a serving cell identified by the cross carrier information of the first logical information, and a physical resource occupied by the HARQ_ACK information is determined by at least one of the following:
  the DMRS cyclic shift indication of the first DCI; and
  a lowest PRB index for the first uplink data on the working frequency band of the first configuration information.

A transmitting frequency band of the re-transmission data is one of the following:
  Option 1: the working frequency band of the first configuration information; and
  Option 2: the working frequency band of one configuration information among the S with the carrier index being equal to the physical index of the downlink signaling.

Embodiment VI

Figure 6:
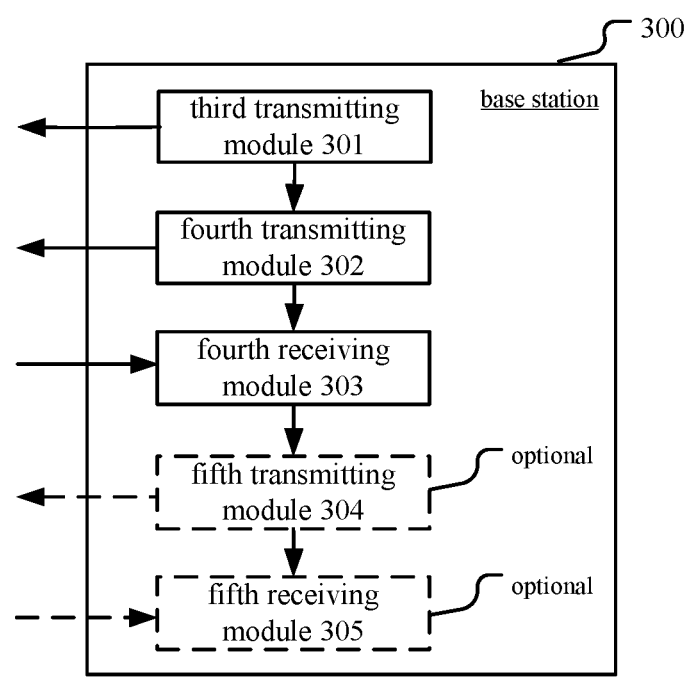
FIG. 6 is a structure schematic diagram illustrating a processing device in a base station according to one embodiment of the present disclosure.

Embodiment VI is a structure schematic diagram illustrating a processing device in a base station, as shown in FIG. 6. In FIG. 6, the processing device 300 in the base station mainly includes a third transmitting module 301, a fourth transmitting module 302, a fourth receiving module 303, a fifth transmitting module 304 and a fifth receiving module 305, wherein the fifth transmitting module 304 and the fifth receiving module 305 are an optional module.

The third transmitting module 301 is used for transmitting a higher layer signaling to indicate S and V, wherein the S is L configuration information, and the V is N logical information; the fourth transmitting a first DCI; the fourth receiving module 303 is used for receiving a first uplink data from the working frequency band of a first configuration information in a given sub frame according to the scheduling information of the first DCI; the fifth transmitting module 304 is used for transmitting a downlink signaling to indicate a HARQ_ACK information associated with the first uplink data; the fifth receiving module 305 is used for receiving a re-transmission data of the first uplink data, and a transmitting frequency band of the re-transmission data is one of the following:

In Embodiment VI, each of the configuration information includes a carrier index and a working frequency band, and each of the logical information includes at least one of the following:
  a carrier logical index;
  an antenna information, the antenna information includes a transmission mode; and
  a cross carrier information, the cross carrier information includes a serving cell index.

The first DCI includes a virtual index, a physical information and a scheduling information, and the scheduling information includes a DMRS cyclic shift indication. The first DCI complies with a configuration of a first logical information, and the first logical information is that one logical information of the V with the carrier logical index being equal to the virtual index of the first DCI. All the working frequency bands of the S belong to the unlicensed spectrum, the L is a positive integer, the N is a positive integer not greater than L, and the first configuration information is that one configuration information of the S with the carrier index being equal to the physical index of the first DCI. The downlink signaling is transmitted on a downlink resource of a serving cell identified by the cross carrier information of the first logical information, and a physical resource occupied by the HARQ_ACK information is determined by at least one of the following:
  the DMRS cyclic shift indication of the first DCI; and
  a lowest PRB index for the first uplink data on the working frequency band of the first configuration information.

Those of ordinary skill will be appreciated that all or part of the above method may be accomplished by a program instructing related hardware. The program may be stored in a computer-readable storage medium, such as read-only memory, a hard disk or CD-ROM. Alternatively, all or part of the steps of the above-described embodiments may be accomplished by one or more integrated circuits. Accordingly, each module in the above-described embodiments may be accomplished by hardware implementation, or may also be realized by the form of software modules. The present disclosure is not limited to any particular form of combination of software and hardware.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:
1. A method for transmission on an unlicensed spectrum in a UE, comprising:
  Step A: receiving a higher layer signaling to obtain S and V, wherein the S is L configuration information, the V is N logical information, each of the configuration information comprises a carrier index and a working frequency band, and each of the logical information comprises at least one of the following:

a carrier logical index;
an antenna information, wherein the antenna information comprises a transmission mode; and
a cross carrier information, wherein the cross carrier information comprises a serving cell index;

Step B: receiving a first DCI, wherein the first DCI comprises a virtual index, a physical index and a scheduling information, and the scheduling information comprises a DMRS cyclic shift indication; and Step C: transmitting a first uplink data from the working frequency band of a first configuration information in a given sub frame according to the scheduling information of the first DCI;

wherein, the first DCI complies with a configuration of a first logical information, the first logical information is that one logical information of the V with the carrier logical index being equal to the virtual index of the first DCI; all the working frequency bands of the S belong to the unlicensed spectrum, the L is a positive integer, the N is a positive integer not greater than L, and the first configuration information is that one configuration information of the S with the carrier index being equal to the physical index of the first DCI.

2. The method for transmission on the unlicensed spectrum in the UE according to claim 1, wherein the logical information comprises the cross carrier information, and the first DCI is transmitted on a downlink resource of a serving cell identified by the cross carrier information of the first logical information.

3. The method for transmission on the unlicensed spectrum in the UE according to claim 1, wherein the carrier logical index is a positive integer less than 8.

4. The method for transmission on the unlicensed spectrum in the UE according to claim 1, wherein the N is 1.

5. The method for transmission on the unlicensed spectrum in the UE according to claim 1, wherein the configuration information further comprises at least one of the following:
a cell physical identification, the cell physical indicator is a positive integer from 0 to 503;
a power control configuration information;
a PUSCH configuration information, the PUSCH configuration information comprises a DMRS cyclic shift offset;
a maximum transmission power; and
a SRS configuration information.

6. The method for transmission on the unlicensed spectrum in the UE according to claim 1, wherein the V shares the same transmission mode.

7. The method for transmission on the unlicensed spectrum in the UE according to one of claim 1, further comprising the following step:
Step D: receiving a downlink signaling to obtain a HARQ_ACK information associated with the first uplink data, the downlink signaling is transmitted on a downlink resource of a serving cell identified by the cross carrier information of the first logical information, and a physical resource occupied by the HARQ_ACK information is determined by at least one of the following:
the DMRS cyclic shift indication of the first DCI; and
a lowest PRB index for the first uplink data on the working frequency band of the first configuration information.

8. The method for transmission on the unlicensed spectrum in the UE according to claim 7, wherein the physical resource is determined according to a PHICH scheme of LTE, and the PHICH scheme of the LTE assumes that $n_{DMRS}$ is the DMRS cyclic shift indication and $I_{PRB\_RA}^{lowest\_index}$ is the lowest PRB index.

9. The method for transmission on the unlicensed spectrum in the UE according to claim 7, further comprising the following step:
Step E: transmitting a re-transmission data of the first uplink data, and a transmitting frequency band of the re-transmission data is one of the following:
Option 1: the working frequency band of the first configuration information; and
Option 2: the working frequency band of one configuration information among the S with the carrier index being equal to the physical index of the downlink signaling.

10. A method for transmission on an unlicensed spectrum in a base station, comprising:
Step A: transmitting a higher layer signaling to indicate S and V, wherein the S is L configuration information, the V is N logical information, each of the configuration information comprises a carrier index and a working frequency band, and each of the logical information comprises at least one of the following:
a carrier logical index;
an antenna information, wherein the antenna information comprises a transmission mode; and
a cross carrier information, wherein the cross carrier information comprises a serving cell index;

Step B: transmitting a first DCI, wherein the first DCI comprises a virtual index, a physical index and a scheduling information, and the scheduling information comprises a DMRS cyclic shift indication; and Step C: receiving a first uplink data from the working frequency band of a first configuration information in a given sub frame according to the scheduling information of the first DCI;

wherein the first DCI complies with a configuration of a first logical information, the first logical information is that one logical information of the V with the carrier logical index being equal to the virtual index of the first DCI; all the working frequency bands of the S belong to the unlicensed spectrum, the L is a positive integer, the N is a positive integer not greater than L, and the first configuration information is that one configuration information of the S with the carrier index being equal to the physical index of the first DCI.

11. The method for transmission on the unlicensed spectrum in the base station according to claim 10, wherein the logical information comprises the cross carrier information, and the first DCI is transmitted on a downlink resource of a serving cell identified by the cross carrier information of the first logical information.

12. The method for transmission on the unlicensed spectrum in the base station according to claim 10, wherein the carrier logical index is a positive integer less than 8.

13. The method for transmission on the unlicensed spectrum in the base station according to claim 10, wherein the configuration information further comprises at least one of the following:
a cell physical identification, the cell physical indicator is a positive integer from 0 to 503;
a power control configuration information;
a PUSCH configuration information, the PUSCH configuration information comprises a DMRS cyclic shift offset;
a maximum transmission power; and
a SRS configuration information.

14. The method for transmission on the unlicensed spectrum in the base station according to claim 10, further comprising the following step:
Step D: transmitting a downlink signaling to indicate a HARQ_ACK information associated with the first uplink data, the downlink signaling is transmitted on a downlink resource of a serving cell identified by the cross carrier information of the first logical information, and a physical resource occupied by the HARQ_ACK information is determined by at least one of the following:
the DMRS cyclic shift indication of the first DCI; and
a lowest PRB index for the first uplink data on the working frequency band of the first configuration information.

15. The method for transmission on the unlicensed spectrum in the base station according to claim 14, further comprising the following step:
Step E: receiving a re-transmission data of the first uplink data, and a transmitting frequency band of the re-transmission data is one of the following:
Option 1: the working frequency band of the first configuration information; and
Option 2: the working frequency band of one configuration information among the S with the carrier index being equal to the physical index of the downlink signaling.

16. An user equipment, comprising:
a first module, for receiving a higher layer signaling to obtain S and V, wherein the S is L configuration information, the V is N logical information, each of the configuration information comprises a carrier index and a working frequency band, and each of the logical information comprises at least one of the following:
a carrier logical index;
an antenna information, the antenna information comprises a transmission mode; and
a cross carrier information, the cross carrier information comprises a serving cell index;
a second module, for receiving a first DCI, wherein the first DCI comprises a virtual index, a physical index and a scheduling information, and the scheduling information comprises a DMRS cyclic shift indication; and
a third module, for transmitting a first uplink data from the working frequency band of a first configuration information in a given sub frame according to the scheduling information of the first DCI;
wherein the first DCI complies with a configuration of a first logical information; the first logical information is that one logical information of the V with the carrier logical index being equal to the virtual index of the first DCI; all the working frequency bands of the S belong to the unlicensed spectrum, the L is a positive integer, the N is a positive integer not greater than L, and the first configuration information is that one configuration information of the S with the carrier index being equal to the physical index of the first DCI.

17. The user equipment according to claim 16, further comprising:
a fourth module, for receiving a downlink signaling to obtain a HARQ_ACK information associated with the first uplink data, the downlink signaling is transmitted on a downlink resource of a serving cell identified by the cross carrier information of the first logical information, and a physical resource occupied by the HARQ_ACK information is determined by at least one of the following:
the DMRS cyclic shift indication of the first DCI; and
a lowest PRB index for the first uplink data on the working frequency band of the first configuration information; and
a fifth module, for transmitting a re-transmission data of the first uplink data, and a transmitting frequency band of the re-transmission data is one of the following:
Option 1: the working frequency band of the first configuration information; and
Option 2: the working frequency band of one configuration information among the S with the carrier index being equal to the physical index of the downlink signaling.

18. A base station equipment, comprising:
a first module, for transmitting a higher layer signaling to indicate S and V, wherein the S is L configuration information, the V is N logical information, each of the configuration information comprises a carrier index and a working frequency band, and each of the logical information comprises at least one of the following:
a carrier logical index;
an antenna information, the antenna information comprises a transmission mode; and
a cross carrier information, the cross carrier information comprises a serving cell index;
a second module, for transmitting a first DCI, wherein the first DCI comprises a virtual index, a physical index and a scheduling information, and the scheduling information comprises a DMRS cyclic shift indication; and
a third module, for receiving a first uplink data from the working frequency band of a first configuration information in a given sub frame according to the scheduling information of the first DCI;
wherein the first DCI complies with a configuration of a first logical information; the first logical information is that one logical information of the V with the carrier logical index being equal to the virtual index of the first DCI; all the working frequency bands of the S belong to the unlicensed spectrum, the L is a positive integer, the N is a positive integer not greater than L, and the first configuration information is that one configuration information of the S with the carrier index being equal to the physical index of the first DCI.

19. The base station equipment according to claim 18, further comprising:
a fourth module, for transmitting a downlink signaling to indicate a HARQ_ACK information associated with the first uplink data, wherein the downlink signaling is transmitted on a downlink resource of a serving cell identified by the cross carrier information of the first logical information, and a physical resource occupied by the HARQ_ACK information is determined by at least one of the following:
the DMRS cyclic shift indication of the first DCI; and
a lowest PRB index for the first uplink data on the working frequency band of the first configuration information; and
a fifth module, for receiving a re-transmission data of the first uplink data, and a transmitting frequency band of the re-transmission data is one of the following:
Option 1: the working frequency band of the first configuration information; and
Option 2: the working frequency band of one configuration information among the S with the carrier index being equal to the physical index of the downlink signaling.

* * * * *

UNITED STATES PATENT AND TRADEMARK OFFICE
CERTIFICATE OF CORRECTION

| | |
|---|---|
| PATENT NO. | : 9,980,151 B2 |
| APPLICATION NO. | : 15/125956 |
| DATED | : May 22, 2018 |
| INVENTOR(S) | : Xiaobo Zhang |

It is certified that error appears in the above-identified patent and that said Letters Patent is hereby corrected as shown below:

In the Claims

In Claim 5, at Column 15, Line 39, delete "indicator" and insert therefor -- identification --.
In Claim 13, at Column 16, Line 60, delete "indicator" and insert therefor -- identification --.
In Claim 16, at Column 17, Line 53, after "to" delete "the" and insert therefor -- an --.
In Claim 18, at Column 18, Line 39, after "to" delete "the" and insert therefor -- an --.

Signed and Sealed this
Twentieth Day of August, 2024

Katherine Kelly Vidal
*Director of the United States Patent and Trademark Office*